(12) United States Patent
Yasuda et al.

(10) Patent No.: US 8,746,057 B2
(45) Date of Patent: Jun. 10, 2014

(54) FLOW RATE MEASURING DEVICE AND FLOW RATE CONTROLLER

(75) Inventors: Tadahiro Yasuda, Kyoto (JP); Hiroshi Takakura, Kyoto (JP)

(73) Assignee: Horiba STEC Co., Ltd., Kyoto-shi (JP)

( * ) Notice: Subject to any disclaimer, the term of this patent is extended or adjusted under 35 U.S.C. 154(b) by 221 days.

(21) Appl. No.: 13/525,116

(22) Filed: Jun. 15, 2012

(65) Prior Publication Data

US 2012/0318383 A1  Dec. 20, 2012

(30) Foreign Application Priority Data

Jun. 17, 2011 (JP) .................................. 2011-135765

(51) Int. Cl.
*G01F 1/68* (2006.01)
(52) U.S. Cl.
USPC ...................................................... 73/204.21
(58) Field of Classification Search
USPC .................. 73/204.21, 204.22, 202.5, 861.46
See application file for complete search history.

(56) References Cited

U.S. PATENT DOCUMENTS

| | | | | |
|---|---|---|---|---|
| 5,804,717 | A | * | 9/1998 | Lucas .............................. 73/202 |
| 6,513,375 | B2 | * | 2/2003 | Uramachi et al. ......... 73/204.22 |
| 6,532,809 | B2 | * | 3/2003 | Robinson ................... 73/114.45 |

FOREIGN PATENT DOCUMENTS

JP         H0255123 U     4/1990

* cited by examiner

*Primary Examiner* — Jewel V Thompson
(74) *Attorney, Agent, or Firm* — Allenman Hall McCoy Russell & Tuttle LLP

(57) ABSTRACT

A flow rate measuring device includes a fluid resistance member through which measurement target fluid flows; an upstream side pressure sensor configured to measure pressure on an upstream side of the fluid resistance member from a change of electrical resistance of a resistive element attached to a pressure sensitive surface onto which the target fluid is introduced, and also to measure a temperature of the pressure sensitive surface from a temperature-dependent change of the electrical resistance of the resistive element; a temperature sensor to measure a temperature of the target fluid flowing through the fluid resistance member; and a flow rate calculation part that calculates a flow rate of the target fluid based on the pressure measured by the upstream side pressure sensor, pressure-flow rate characteristics of the fluid resistance member, the upstream side pressure sensor temperature, and the target fluid temperature in the fluid resistance member.

7 Claims, 13 Drawing Sheets

FLOW RATE MEASURING DEVICE AND FLOW RATE CONTROLLER

TECHNICAL FIELD

The present invention relates to a flow rate measuring device that, on the basis of pressure, measures a flow rate of, for example, material gas or the like used in a semiconductor process, and a flow rate controller using the flow rate measuring device.

BACKGROUND ART

In this sort of flow rate measuring device or flow rate controller, a fluid resistance member is provided, and from pressures on an upstream side and downstream side of the fluid resistance member, a flow rate is calculated (in a semiconductor process or the like, in the case where pressure on a downstream side is low, such as the case where the downstream side is connected to a vacuum chamber, a flow rate can be accurately calculated only from pressure on an upstream side).

For this purpose, there is known a device in which, for example, one common body unit that is a manifold block inside which flow paths are formed is formed, and the body unit is attached and integrated with the fluid resistance member and a pressure sensor.

In order to more accurately calculate a flow rate, a temperature of fluid is also required. For example, in the case of a pressure sensor of a type using a resistive element, an electrical resistance value of the resistive element is changed depending on the temperature to give rise to an error in a measured value, and therefor by measuring temperature at the pressure sensor, more accurate pressure in which the error is corrected can be measured. Also, fluid temperature influences viscosity or the like, and therefore if the fluid temperature at the fluid resistance member is known, the flow rate can be more accurately calculated.

Accordingly, in the past, for example, as illustrated in FIG. 13, a temperature sensor is attached to the body unit, and the temperature indicated by the temperature sensor is regarded as the temperatures at the fluid resistance member and pressure sensors to calculate the flow rate.

On the other hand, under circumstances of recent years where downsizing and simplification of devices are required, an open-close valve or the like attached on a upstream side or downstream side of the flow rate measuring device or flow rate controller has been changed from a pneumatic type valve to an electromagnetic type valve, and arranged more closely.

CITATION LIST

Patent Literature

Patent literature 1: JPU 1992-55123

SUMMARY OF THE INVENTION

Technical Problem

However, as a result of intensive examination by the present inventors, it has turned out that there occurs a phenomenon in which due to heat generated from the electromagnetic type open-close valve or the like at the time of applying current, if such an open-close valve is arranged near the flow rate measuring device or flow rate controller, the temperatures of the pressure sensors and fluid resistance member are varied with time, and the temperatures are different among them.

Accordingly, even if temperature is measured at one site as in the conventional case, the temperature does not necessarily indicate the actual temperature of each of the pressure sensors or fluid resistance member, which may result in a measurement error. However, if the number of temperature sensors is simply increased, the requirements for the downsizing and the like cannot be met.

The present invention is made in consideration of the above-described problems which were first revealed by the present inventors, and a main object thereof is, in this sort of flow rate measuring device or flow rate controller, without losing compactness, to improve flow rate measurement accuracy.

Solution to Problem

That is, a flow rate measuring device according to the present invention is provided with: a fluid resistance member through which target fluid to be measured flows; an upstream side pressure sensor that has a pressure sensitive surface onto which the target fluid on an upstream side in the fluid resistance member is introduced, the upstream side pressure sensor configured to separately or simultaneously operate in a pressure measurement mode in which pressure of the target fluid is measured from a change of an electrical resistance value of a resistive element that is provided so as to be deformed in conjunction with deformation of the pressure sensitive surface, and operate in a temperature measurement mode in which a temperature of the upstream side pressure sensor is measured from a temperature-dependent change of the electrical resistance value of the resistive element; a temperature sensor that is arranged in a location where the temperature of the target fluid flowing through the fluid resistance member may be measured; and a flow rate calculation part that calculates a flow rate of the target fluid on a basis of at least a pressure of an upstream side flow path, which is measured in the pressure measurement mode, a pressure-flow rate characteristic of the fluid resistance member, the upstream side pressure sensor temperature measured in the temperature measurement mode, and the temperature of the target fluid in the fluid resistance member, which is measured by the temperature sensor.

As a calculation parameter in the flow rate calculation part, the pressure-flow rate characteristic of the fluid resistance member may be further used.

If so, even if the temperatures of the pressure sensor and fluid resistance member are varied with time due to heat generated from an electromagnetic type open-close valve or the like at the time of applying current, and the temperatures are different between them, the temperature of the pressure sensor and the temperature of the target fluid flowing through the fluid resistance member are separately measured, and the respective measured temperatures are used as calculation parameters in the calculation of the flow rate of the target fluid, so that the flow rate can be calculated with an extremely high accuracy.

Also, the resistive element for measuring the pressure is shared as means adapted to measure the temperature of the pressure sensor, and therefore compactness is not lost.

The temperature sensor adapted to measure the temperature of the target fluid is provided in proximity to the fluid resistance member.

Configurations that particularly remarkably produce an effect of the present invention can include one that is further provided with a body unit that is formed with an internal flow path through which the target fluid flows and has a longer direction, wherein: the fluid resistance member is attached to the body unit so as to divide the internal flow path; and the upstream side pressure sensor is attached to a component attachment surface that is set to a surface parallel to the longer direction of the body unit such that the pressure sensitive surface thereof is in an orientation that is substantially vertical to the component attachment surface and substantially parallel to the longer direction.

This is because in such a configuration, the pressure sensitive surface is raised vertically, and therefore as compared with a configuration in which the pressure sensitive surface is laid down, the pressure sensor is distant from the internal flow path provided with the fluid resistance member, so that a temperature difference between the fluid resistance member and the pressure sensitive surface tends to be increased to increase an error only with one temperature sensor as in the conventional case; however, according to the present invention, such an error can be certainly reduced to measure the flow rate with high accuracy.

In order to bring the temperature sensor as close to the fluid resistance member as possible to keep the compactness, preferably, the fluid resistance member is fitted into a concave portion that is opened on the component attachment surface of the body unit; the upstream side pressure sensor is provided with a main body member inside which the pressure sensitive surface is formed; and an opening of the concave portion is sealed by the main body member, and immediately above an opening sealing surface in the main body member, the temperature sensor is incorporated.

Further, the present invention is preferably applied to the flow rate measuring device wherein the fluid resistance member flows the target fluid in a laminar flow state.

If a pressure sensor on a downstream side is configured to have the same functions, the flow rate can be more accurately measured. Specifically, the flow rate measuring device is further provided with a downstream side pressure sensor that has a pressure sensitive surface onto which the target fluid on a downstream side in the fluid resistance member is introduced, the downstream side pressure sensor configured to separately or simultaneously operate in a pressure measurement mode in which pressure of a flow path on a downstream side of the fluid resistance member is measured from a change of an electrical resistance value of a resistive element that is provided so as to be deformed in conjunction with deformation of the pressure sensitive surface, and operate in a temperature measurement mode in which a temperature of the downstream side pressure sensor is measured from a temperature-dependent change of the electrical resistance value of the resistive element, wherein the flow rate calculation part calculates the flow rate of the target fluid further on the basis of the pressure of the downstream side flow path, which is measured in the pressure measurement mode, and the temperature of the downstream side pressure sensor, which is measured in the temperature measurement mode.

Also, the flow rate measuring device according to the present invention may be used to constitute a flow rate controller.

Advantageous Effects of Invention

As described above, according to the present invention, in a differential pressure type flow rate measuring device or a flow rate controller using it, without losing compactness, flow rate measurement accuracy can be improved.

DESCRIPTION OF THE EMBODIMENTS

Figure 1:
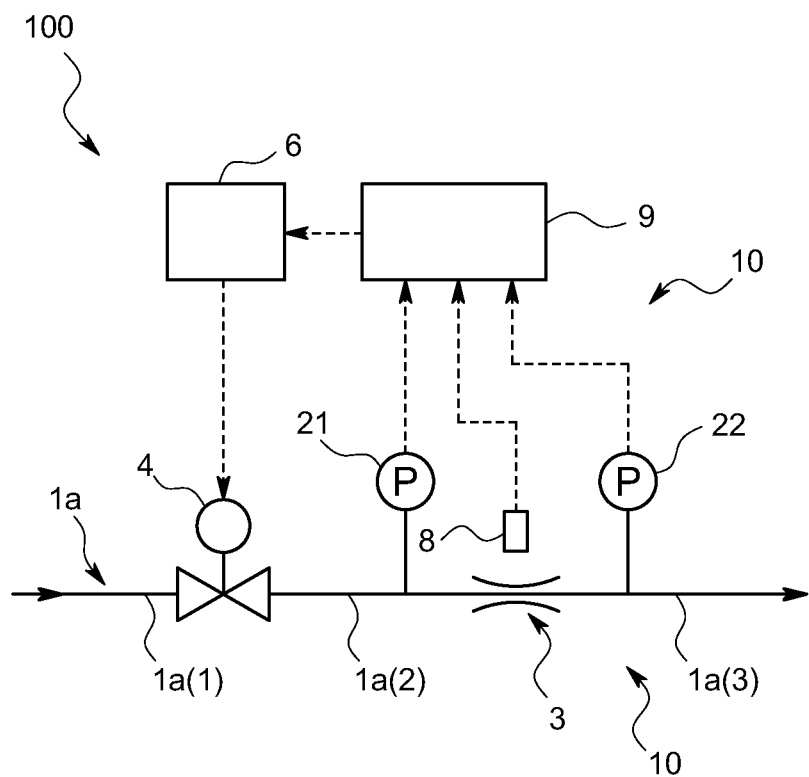
FIG. 1 is a fluid circuit diagram of a flow rate controller in one embodiment of the present invention.

In the following, one embodiment of the present invention is described referring to the drawings.

Figure 2:
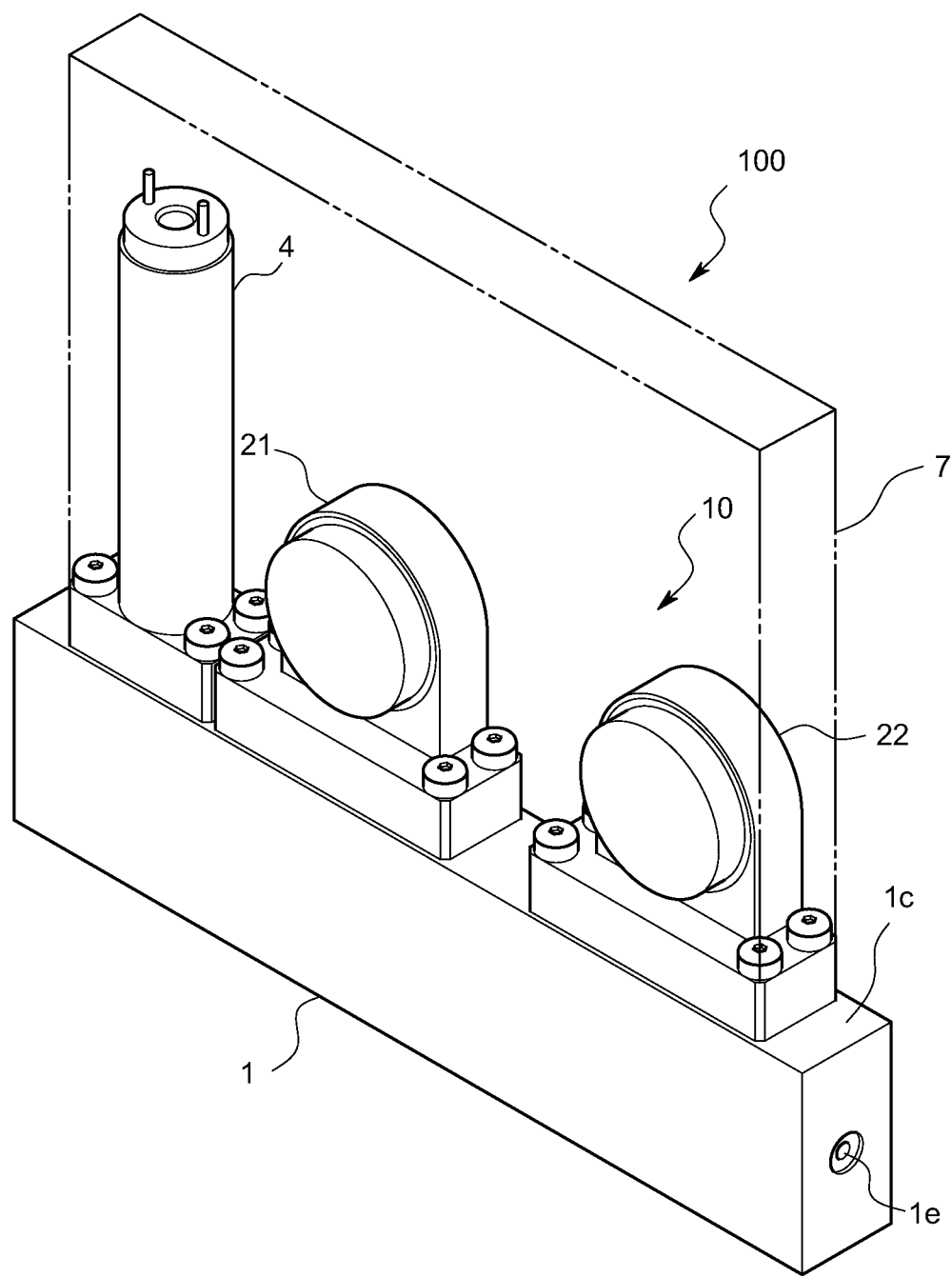
FIG. 2 is an overall perspective view of the flow rate controller in the same embodiment.

A flow rate controller 100 according to the present embodiment is one that is, for example, mounted on a gas panel to constitute a part of a material supply line of a semiconductor manufacturing apparatus, and as illustrated in a fluid circuit diagram of FIG. 1 and an overall perspective view of FIG. 2, is provided with a body unit 1 that has an internal flow path 1a through which fluid serving as a flow rate control target flows, a flow rate control valve 4 that is provided on the internal flow path 1a, a flow rate measuring device 10 that is provided on a downstream side of the flow rate control valve 4 and measures a mass flow rate of the fluid flowing through the internal flow path 1a, and a control circuit 6 that controls the flow rate control valve 4 such that a measured flow rate by the flow rate measuring device 10 coincides with a preset target flow rate. The respective parts are described in detail below.

The body unit 1 is one that is, as illustrated in FIG. 2, formed in an elongated rectangular parallelepiped shape and made of, for example, metal. One surface parallel to a longer direction in the body unit 1 is set as a component attachment surface 1c, and the body unit 1 is configured such that only to the component attachment surface 1c are components such as the flow rate control valve 4 and pressure sensors 21 and 22 attached. Also, a surface on a side opposite to the attachment surface 1c is set as a fixation surface for fixing the body unit 1 to a panel or the like. Further, the body unit is configured such that, to the other two surfaces (hereinafter referred to as side surfaces) parallel to the longer direction, nothing is attached, and thereby a plurality of body units 1 can be arranged with side surfaces of the body units 1 being in close contact with or close to each other.

Figure 3:
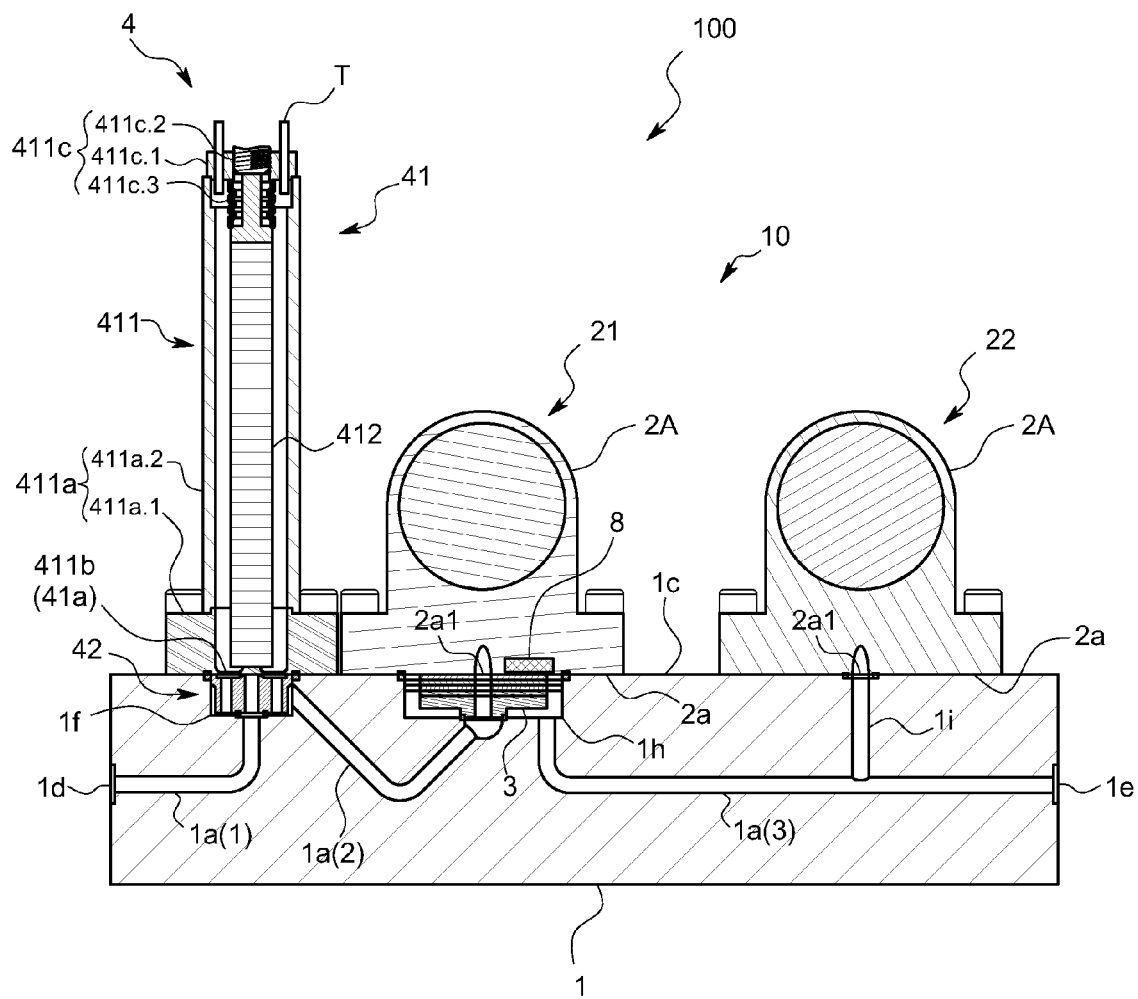
FIG. 3 is a vertical cross-sectional view illustrating an internal structure of the flow rate controller in the same embodiment.

The internal flow path 1a is one that extends in the longer direction from one end part toward the other end part of the body unit 1, and more specifically, as illustrated in FIG. 3, configured such that a fluid introduction port 1d and fluid lead-out port 1e thereof are respectively opened on both end surfaces orthogonal to the longer direction of the body unit 1. Also, as viewed from a direction orthogonal to the component attachment surface 1c (hereinafter also referred to as a plan view), the internal flow path 1a is configured such that the fluid flows substantially parallel to the longer direction.

Figure 4:
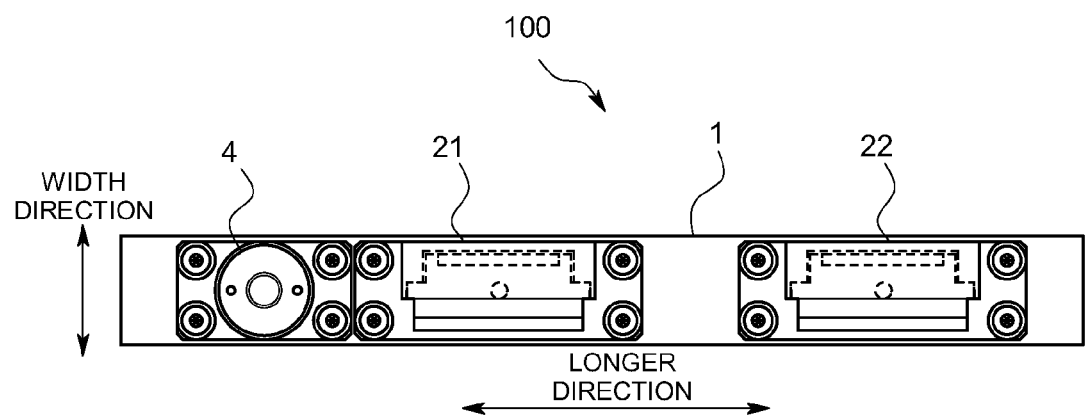
FIG. 4 is a plan view of the flow rate controller in the same embodiment.
Figure 6:
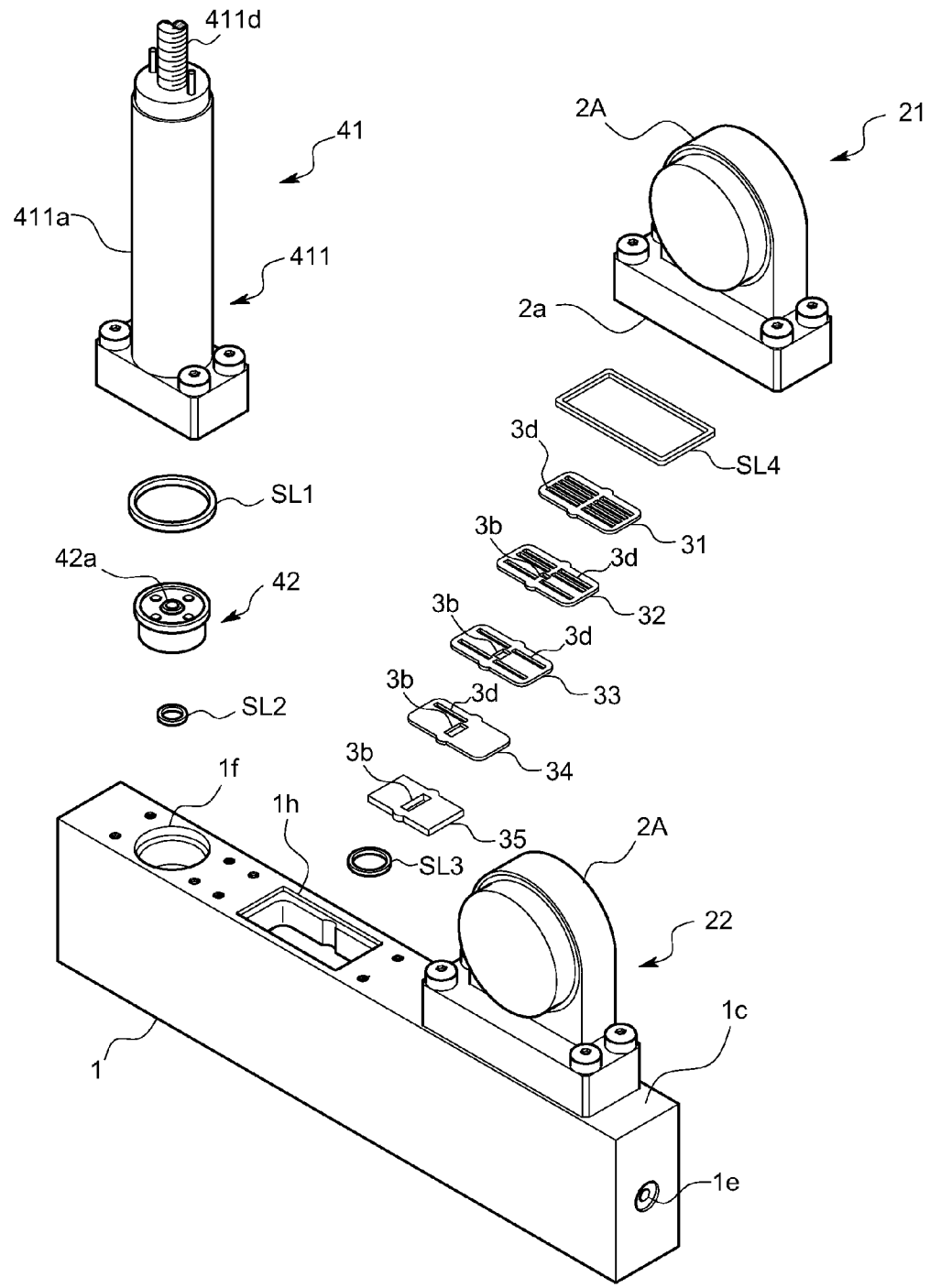
FIG. 6 is an exploded perspective view of the flow rate controller in the same embodiment.
Figure 7:
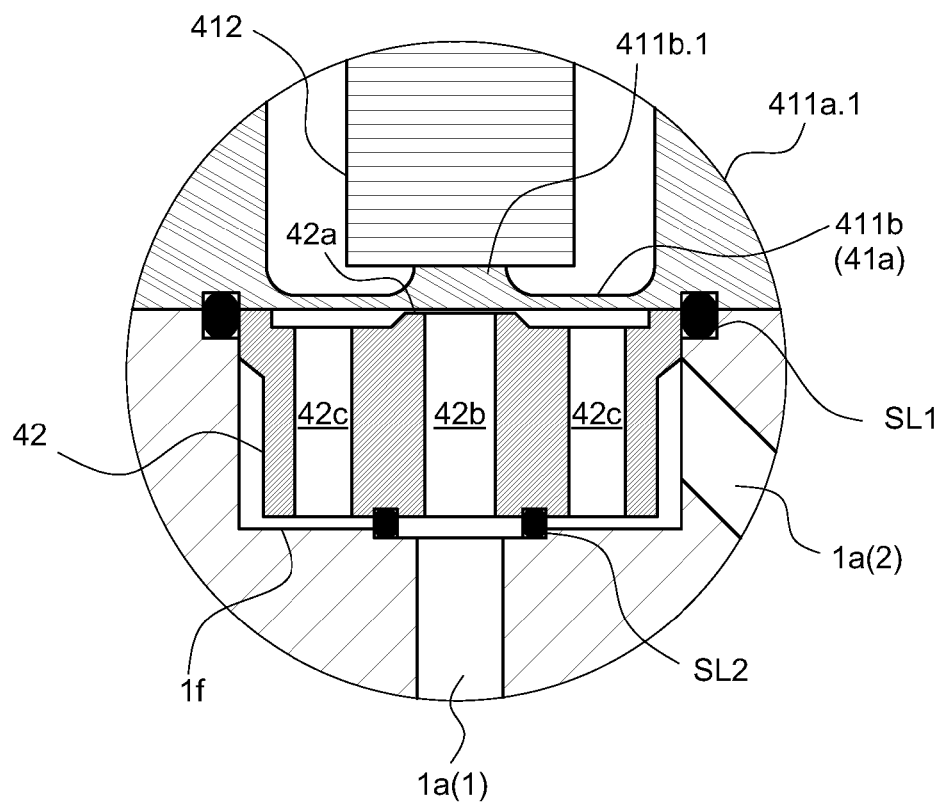
FIG. 7 is a partial cross-sectional view illustrating an internal structure of a flow rate control valve in the same embodiment.

The flow rate control valve 4 is one that, as illustrated in FIGS. 3, 6, and 7, includes a valve seat member 42 and a valve element member 41 and is columnar, and vertically attached to one end part on the fluid introduction port 1d side in the component attachment surface 1c. A maximum width size of the flow rate control valve 4 is set to be smaller than or equal to a width size (a size in a direction orthogonal to the longer direction) of the component attachment surface 1c, and as illustrated in FIG. 4, the flow rate control valve 4 is configured not to protrude from the body unit 1 in the width direction in a state of being attached to the body unit 1.

Of the members constituting the flow rate control valve 4, the valve seat member 42 is one that, as illustrated in FIGS. 6 and 7, has a top surface central part on which an annular seating surface 42a is formed with being protruded, and is formed in a substantially columnar shape. Also, in the valve seat member 42, a fluid introduction path 42b of which one end is opened in the top surface central part (specifically, inside the valve seating surface 42a) of the valve seat member 42 and the other end is opened in a bottom surface central part of the valve seat member 42, and a fluid lead-out path 42c of which one end is opened in a top surface circumferential edge part (more specifically, outside the valve seating surface 42a) of the valve seat member 42 and the other end is opened in a bottom surface circumferential edge part of the valve seat member 42, are made to pass through.

The valve seat member 42 is fitted into a bottom-equipped concave portion 1f that is opened in the one end part of the component attachment surface 1c. The bottom-equipped concave portion 1f is provided in a location where the internal flow path 1a is divided. Specifically, in a bottom surface central part of the bottom-equipped concave portion 1f, an end point of an upstream side internal flow path 1a(1) of divided pieces of the internal flow path 1a is opened, and on a bottom part side circumferential surface of the bottom-equipped concave portion 1f, a start point of a downstream side internal flow path 1a(2) is opened.

Thus, on the basis of this configuration, in a state where the valve seat member 42 is fitted into the bottom-equipped concave portion 1f, the other end of the fluid introduction path 42b is, through a seal member SL2, communicatively connected to the end point of the upstream side internal flow path 1a(1), which is opened in the center of the bottom-equipped concave portion 1f, and also the other end of the fluid lead-out path 42c is communicatively connected to the start point of the downstream side internal flow path 1a(2) because, from the bottom surface circumferential edge part to a side circumferential surface bottom part of the valve seat member 42, there is a gap with an inner circumferential surface of the bottom-equipped concave portion 1f.

Figure 8:
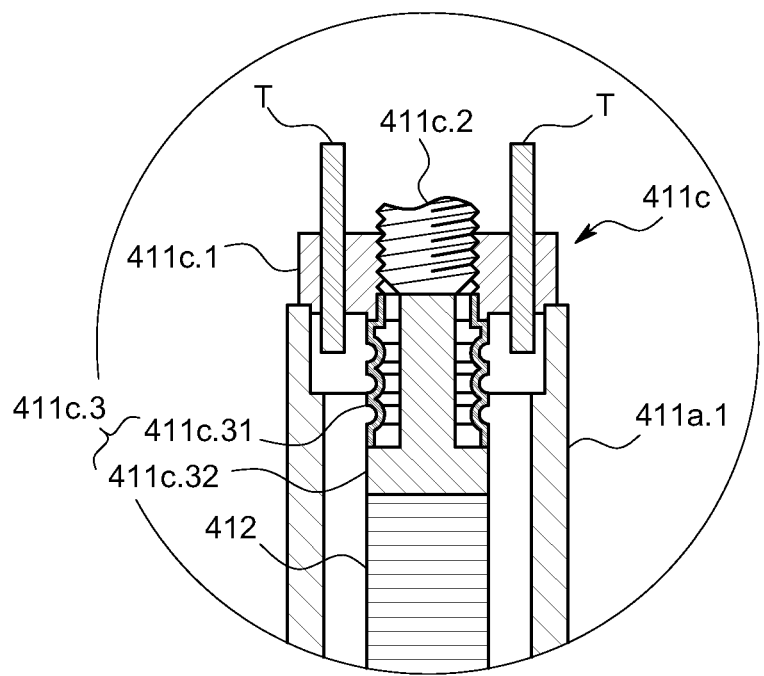
FIG. 8 is a partial cross-sectional view illustrating the internal structure of the flow rate control valve in the same embodiment.

On the other hand, the valve element member 41 is, as illustrated in FIGS. 3, 7, and 8, provided with a casing 411 that is configured to bring an inside thereof into an airtight state and a stacked piezoelectric element 412 that is contained inside the casing 411 and formed in a columnar shape.

The casing 411 is one that is provided with a housing 411a that is formed in a long-sized tubular shape, a diaphragm member 411b that blocks one end surface of the housing 411a in an airtight manner and has an elastically deformable thin plate shape, and a blocking member 411c that blocks the other end surface of the housing 411a in an airtight manner.

The housing 411a is one that includes a blockish other end side element 411a.1 that is attached to the component attachment surface 1c so as to cover the bottom-equipped concave portion 1f and a cylindrical one end side element 411a.2 that is communicatively connected to the one end side element 411a.1.

The diaphragm member 411b is, as illustrated in FIG. 7, an elastically deformable thin plate that, in the center thereof, has a protrusion 411b.1 protruding inward, and molded integrally with the one end side element 411a.1.

The blocking member 411c is one that is, as illustrated in FIG. 8, provided with a disc-like member main body 411c.1 that is attached so as to block the other end surface of the housing 411a, an adjustment screw 411c.2 that is screwed into a female screw hole punctured in the center of the member main body 411c.1 and that can move forward and backward, and an airtightness holding member 411c.3 that is attached to an inner surface of the member main body 411c.1 so as to surround the screw thread portion. In addition, the member main body 411c.1 is penetrated by a terminal T for driving the piezoelectric element in an airtight manner, i.e., has a so-called hermetic structure. The airtightness holding member 411c.3 includes a tubular bellows part 411c.31 that elastically expands or contracts in an axial direction and a columnar member 411c.32 that is joined to a bottom part of the bellows part 411c.31 in an airtight manner.

The columnar member 411c.32 is one that intervenes between the adjustment screw 411c.2 and the stacked piezoelectric element 412, and is configured to be able to, by screwing the adjustment screw 411c.2 forward or backward, adjust a position of the stacked piezoelectric element 412 in the axial direction through the columnar member 411c.32. In addition, a fore end surface of the columnar member 411c.32 and a base end surface of the stacked piezoelectric element 412 are bonded to each other.

By attaching the one end surface of the housing 411a to the component attachment surface 1c of the body unit 1 through the seal member SL1, the opening of the bottom-equipped concave portion 1f, which is formed in the body unit 1, is sealed by the one end surface, and also the diaphragm member 411b is made to face to the valve seating surface 42a, so that a separation distance between the diaphragm member 411b and the valve seating surface 42a is changed by the expansion or contraction of the piezoelectric element 412, and thereby the diaphragm member 411b is adapted to function as a valve element 41a.

The flow rate measuring device 10 is one that is, as illustrated in FIG. 1, provided with a fluid resistance member (restrictor) 3 that is provided on the internal flow path 1a, a pair of pressure sensors 21 and 22 that are respectively intended to measure fluid pressures on upstream and downstream sides of the fluid resistance member 3a, and a flow rate calculation circuit 9 that calculates a flow rate of target gas flowing through the fluid resistance member 3 and serves as a fluid calculation part. The respective parts are described in detail.

Figure 9:
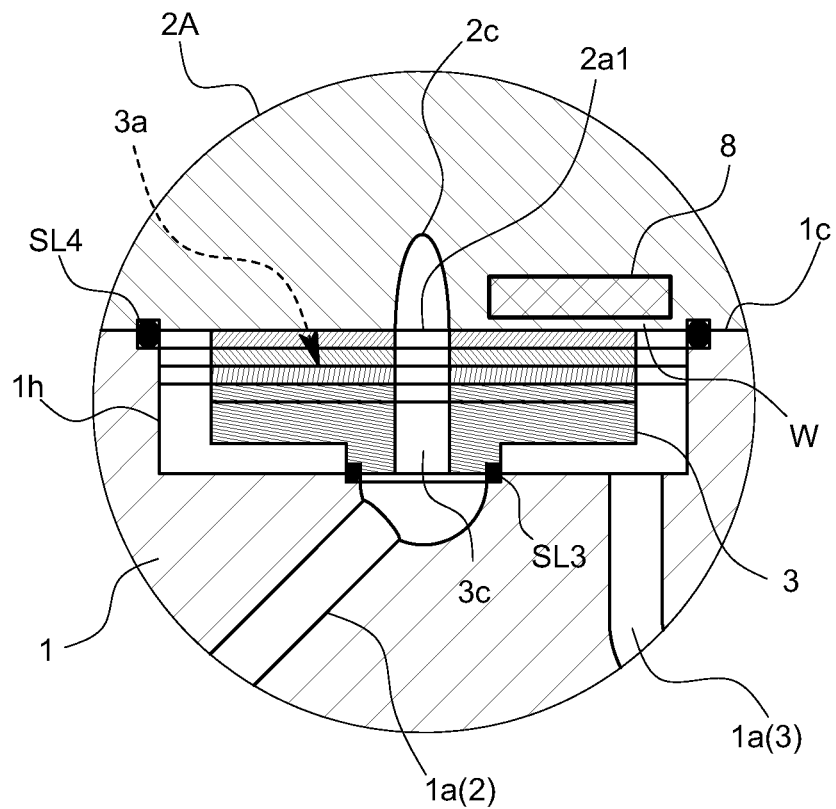
FIG. 9 is a partial cross-sectional view illustrated an internal structure in a state where a fluid resistance member is contained in a concave portion in the same embodiment.

The fluid resistance member 3 is one that is, as illustrated in FIGS. 6 and 9, formed in a rectangular parallelepiped shape in which a plurality of rectangular thin plates 31 to 35 are stacked, and should also be referred to as a laminar flow resistive element because it is configured such that the fluid flowing inside flows in a laminar flow state. The respective thin plates or parts of the thin plates in the fluid resistance member 3 are, as illustrated in FIG. 6, provided with through holes 3b that overlap with each other to form into a communicative connection path 3c when the thin plates are stacked, and slits 3d of which inner ends are communicatively connected to the communicative connection path 3c and outer ends are opened on side surfaces orthogonal to the longer direction, and when the thin plates 31 to 35 are stacked, a resistance flow path 3a is formed by the slits 3d. According to such a configuration, by changing a shape or the number of the slits 3d, flow path resistance can be adjusted.

On the other hand, in the longer direction central part in the component attachment surface 1c of the body unit 1, as illustrated in FIGS. 3, 5, 6, and 9, a rectangular concave portion 1h is provided so as to divide the internal flow path 1a. The fluid resistance member 3 is designed so as to be fitted into the concave portion 1h with having no gap in the width direction and a gap in the longer direction of the body unit 1. Also, the concave portion 1h is configured such that in the bottom surface center of the concave portion 1h, an end point of the upstream side internal flow path 1a(2) of the internal flow path 1a divided by the concave portion 1h is opened, whereas in a bottom surface edge part of the concave portion 1h in the longer direction, a start point of a downstream side internal flow path 1a(3) is opened.

Thus, in a state where the fluid resistance member 3 is fitted into the concave portion 1h, one end on a bottom side of the communicative connection path 3c is connected to the end point of the upstream side internal flow path 1a(2) through a seal member SL3, and an outer end of the resistance flow path 3a is communicatively connected to the start point of the downstream side internal flow path 1a(3). That is, the upstream side internal flow path 1a(2) is connected to the downstream side internal flow path 1a(3) through the communicative connection path 3c and resistance flow path 3a.

Each of the pressure sensors 21 and 22 is one that is, as illustrated for example in FIGS. 2 to 6, provided with a main body member 2A that is formed in a flattened shape and a pressure sensing resistive element 2B incorporated in the main body member 2A. Also, the flattened main body member 2A is attached to the component attachment surface 1c such that a face plate part thereof (flattened surface) is vertical to the component attachment surface 1c and substantially parallel to the longer direction of the body unit, i.e., in the plan view, substantially parallel to a flow direction of the fluid. Also, a thickness size of each of the pressure sensors 21 and 22 is, as illustrated in FIG. 4, set to be smaller than or equal to the width direction size of the component attachment surface 1c, and thereby the pressure sensors 21 and 22 are configured not to protrude from the body unit 1 in the width direction in a state of being attached.

Figure 5:
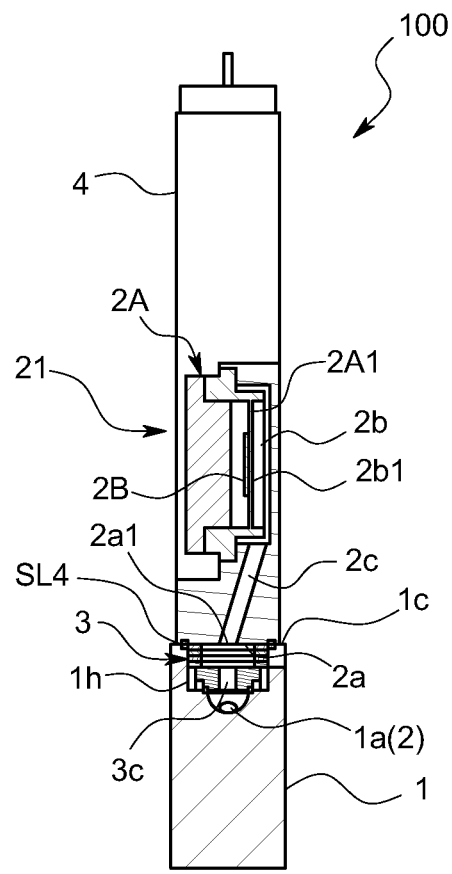
FIG. 5 is a horizontal cross-sectional view illustrating an internal structure of a pressure sensor in the same embodiment.

In the main body member 2A, as illustrated in FIG. 5, a thin disc-like fluid filling chamber 2b of which one surface 2b1 parallel to the surface plate part is formed of an elastically deformable diaphragm wall 2A1 and a fluid introduction path 2c that communicatively connects the fluid filling chamber 2b and pressure introduction port 2a1 to each other are formed. The pressure introduction port 2a1 is opened on an attachment surface 2a attached to the body unit 1. The fluid introduction path 2c is opened on a side surface of the fluid filling chamber 2b, i.e., on a surface vertical to the one surface 2b1, and an extending direction of the fluid introduction path 2c is set to be parallel or slightly oblique to the one surface 2b1.

Figure 10:
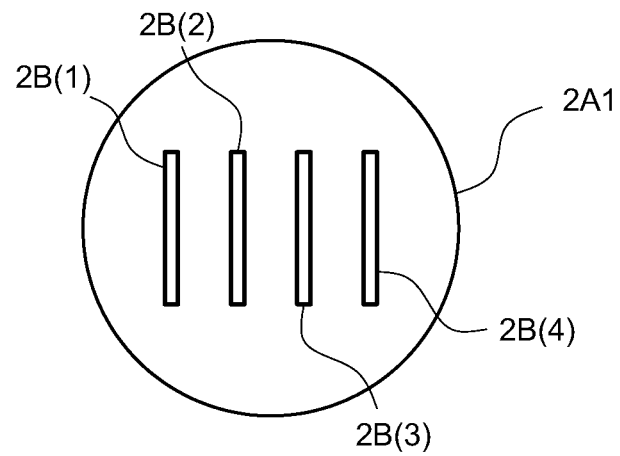
FIG. 10 is a diagram illustrating a state where resistive elements are attached to a pressure sensitive surface in the same embodiment.

As the resistive element 2B, four equivalent elements are used here, which are, as illustrated in FIGS. 5 and 10, attached to a back surface of the diaphragm wall 2A1 in parallel; however, without limitation to this, any of various known attachment methods may be employed, such as attachment to front and back surfaces. The four resistive elements 2B are, for example, as illustrated in an equivalent electrical circuit diagram of FIG. 11, connected so as to constitute a bridge circuit, and configured such that among the resistive elements 2B, middle two elements 2B(2) and 2B(3) serve as opposite resistances in the bridge circuit.

Figure 11:
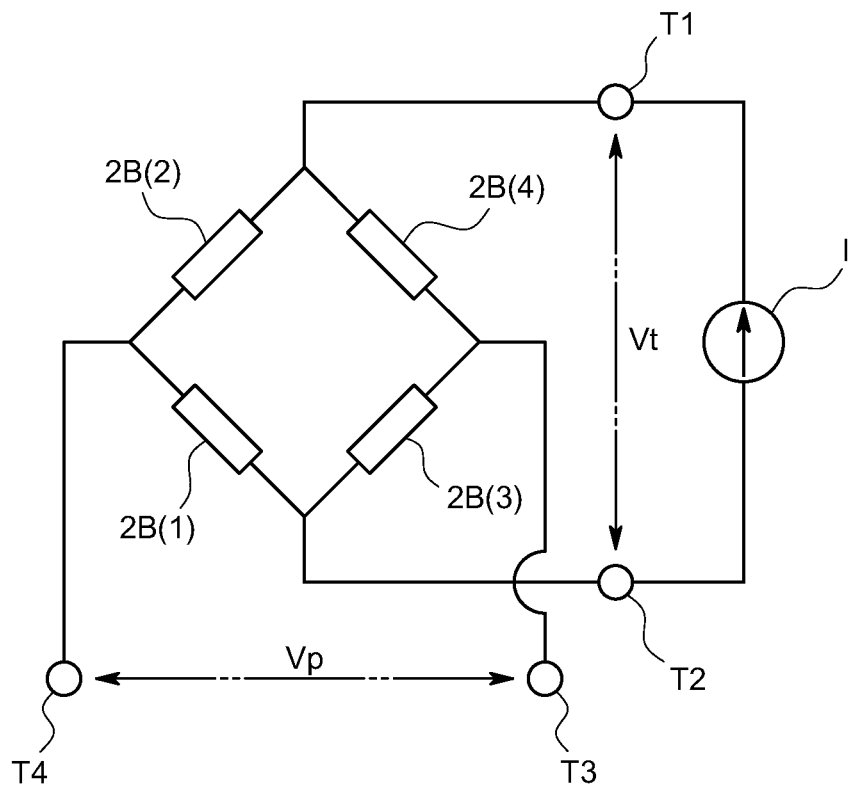
FIG. 11 is an equivalent electrical circuit diagram illustrating connection of the resistive elements in the same embodiment.

Also, as illustrated in FIG. 11, the present embodiment is adapted such that, among connecting points between adjacent resistive elements 2B in the bridge circuit and between diagonally positioned connecting points T1 and T2, a constant current is applied from a separately provided constant current source I, and voltage between another set of diagonally positioned connecting points T3 and T4 can be extracted as pressure indicating voltage Vp. In addition, a mode at the time of extracting or outputting the pressure indicating voltage is a pressure measurement mode.

If such a configuration is employed, in a state where pressure does not act, the one surface 2b1 serving as a pressure-sensitive surface is not deformed, so that equilibrium of the bridge circuit is kept and the pressure indicating voltage is 0; however, when the pressure-sensitive surface 2b1 receives fluid pressure and is thereby deformed, for example, the resistive elements 2B(2) and 2B(3) are expanded and their resistance values are increased respectively by amounts corresponding to the expansion, whereas the resistive elements 2B(1) and 2B(4) are contracted and their resistance values are decreased respectively by amounts corresponding to the contraction, so that the equilibrium of the bridge circuit is disturbed, and therefore the pressure indicating voltage Vp corresponding to the deformation is generated.

Meanwhile, the pressure indicating voltage Vp changes depending on temperature even at the same pressure. This is because an electrical resistance value of each of the resistive elements 2B changes depending on temperature. Accordingly, the present embodiment is adapted to be also able to measure temperature with use of the bridge circuit. Specifically, the present embodiment is adapted such that, with use of the fact that the resistance value of each of the resistive elements 2B changes depending on temperature, voltage between the connecting points connected with the constant current source can be extracted as temperature indicating voltage Vt. That is, the temperature indicating voltage Vt is one that indirectly indicates a combined resistance value of the resistive elements 2B as measured between T1 and T2, and the combined resistance value changes depending on temperature, so that the temperature indicating voltage Vt has a value indicating temperature. Also, a mode at the time of extracting or outputting the temperature indicating voltage is a temperature measurement mode. Further, the combined resistance value is little dependent on pressure, and therefore temperature can be independently measured regardless of pressure.

In addition, specifically, as each of the resistive elements, MEMS (Micro Electro Mechanical Systems) formed of silicon or the like, or piezoelectric element can be cited, and from the perspective of a temperature measuring function, the MEMS is more preferable.

Incidentally, of the pair of pressure sensors 21 and 22, the upstream side pressure sensor 21 is attached to the central part of the component attachment surface 1c of the body unit 1 in the longer direction, and the downstream side pressure sensor 22 is attached to the other end part of the component attachment surface 1c in the longer direction.

The present embodiment is configured such that in particular, the upstream side pressure sensor 21 is attached to the body unit 1, and thereby the attachment surface 2a of it seals the opening of the concave portion 1h through an annular seal member SL4 in an airtight manner and also presses and sandwiches the fluid resistance member 3 in the concave portion 1h with a bottom surface of the concave portion 1h. Based on this, it is not necessary to seal the fluid resistance member 3 with a dedicated lid or the like, and a reduction in the number of components and simplification of assembling can be facilitated to reduce cost.

Also, the present embodiment is configured such that, in this state, the communicative connection path 3c in the fluid resistance member 3 is connected to the pressure introduction port 2a1 of the upstream side pressure sensor 21, and the internal flow path 1a(2) on the upstream side of the resistance flow path 3a is communicatively connected to the upstream side pressure sensor 21 through the communicative connection path 3c.

On the other hand, the present embodiment is adapted such that the internal flow path 1a(3) on the downstream side of the resistance flow path 3a extends along the longer direction of the body unit 1 to reach the fluid lead-out port 1e, and also through a branch path 1i that is branched on the way, is connected to the pressure introduction port 2a1 of the downstream side pressure sensor 22.

Further, in the present embodiment, temperature sensor 8 adapted to measure the temperature of the fluid flowing through the fluid resistance member 3 is provided. The temperature sensor 8 is, for example, a thermistor or a resistance temperature sensor, and is embedded in the main body member 2A of the upstream side pressure sensor 21. More specifically, as illustrated in FIGS. 9 and 3, the temperature sensor 8 is embedded in a location at a distance equal to a thin wall W (thickness of approximately 0.1 mm) from the attachment surface 2a in the main body member 2A, and arranged so as to face to the fluid resistance member 3 through the thin wall W.

The flow rate calculation circuit 9 is one that is physically configured to include a CPU, a memory, an I/O channel, an A/D converter, a D/A converter, and other analog or a digital electrical circuits, and here contained in a cover body 7 that is illustrated in FIG. 2 and attached to the body unit 1 so as to cover the pressure sensors 21 and 22 and flow rate control valve 4; however, it is not necessarily accompanied with the cover body 7 or body unit 1, but may be provided separately from them. In addition, FIG. 2 does not illustrate the flow rate calculation circuit 9.

The flow rate calculation circuit 9 is electrically connected to the pressure sensors 21 and 22 and temperature sensor 8, and is configured to be able to receive the pressure indicating voltages Vp, temperature indicating voltages Vt, and temperature measurement value from the temperature sensor 8.

Also, the flow rate calculation circuit 9 is configured to fulfill functions as described below on the basis of cooperative operation of the CPU and its peripheral devices according to a program stored in the memory.

That is, the functions include one that obtains the pressure indicating voltages Vp outputted from the pressure sensors 21 and 22 respectively to calculate uncorrected pressure values, one that obtains the temperature indicating voltages Vt to calculate pressure sensor temperatures, and one that corrects the uncorrected pressure values with the pressure sensor temperatures to calculate pressures as final outcomes. Note that the pressures as the final outcomes may be directly obtained from the pressure indicating voltages Vp and temperature indicating voltages Vt.

A specific example is cited below.

First, the temperature T is obtained from each of the temperature indicating voltages Vt. This is obtained by, for example, the following predetermined expression:

$$T = e(Vt),$$

where e is a predetermined function (e.g., first-order expression).

Then, when the pressure is changed at temperature $T_1$, a relational expression between true pressure P and a corresponding pressure indicating voltage Vp is obtained by fitting or the like:

$$P(T_1) = f(Vp, a_1, b_1, c_1, d_1, \ldots),$$

where f is a predetermined function (e.g., third-order expression), and $a_1$ to $d_1$ ... are predetermined coefficients obtained by the fitting or the like.

This is repeated at a plurality of (e.g., n) temperatures to obtain the following expression:

$$P(T_k) = f(Vp, a_k, b_k, c_k, d_k, \ldots),$$

where k is an integer from 1 to n.

Subsequently, $a_1$ to $a_n$ (=a) are expressed by functions g(T) using the temperature T as a parameter. The functions g are, for example, multiple-order expressions of T:

$$a = g(T)$$

In the same manner, $b_1$ to $b_n$, $c_1$ to $c_n$, $d_1$ to $d_n$, ... are set as respective functions of temperature, h(T), i(T), j(T), ....

That is, the pressure P can be expressed by a function k using the pressure indicating voltage Vp and temperature indicating voltage Vt as parameters:

$$P = f(Vp, g(T), h(T), i(T), j(T), \ldots) = k(Vp, Vt)$$

Accordingly, from the function k obtained in this manner, and the pressure indicating voltage Vp and temperature indicating voltage Vt, the pressure P can be calculated.

The functions also include one that, on the basis of, in addition to the upstream side pressure and downstream side pressure calculated as described above, pressure-flow rate characteristics of the fluid resistance member 3, which are stored in the memory, and the temperature measurement value from the temperature sensor 8, calculates a flow rate of the fluid flowing through the fluid resistance member, i.e., a flow rate of the fluid flowing through the internal flow path 1a.

Specifically, when the flow is laminar flow, from the Hagen-Poiseuille law (Expression 1), a differential pressure generated in a pipeline, i.e., generated between both ends of the fluid resistance member, is proportional to a volumetric flow rate, and a coefficient of the proportionality includes a viscosity coefficient of the fluid. In addition, the pressure-flow rate characteristics here refer to, for example, a factor defined by r and L in Expression (1) below:

$$Q = \pi \cdot r^4 \cdot \Delta p / (8 \eta L) \qquad (1),$$

where
  r: a flow path radius of the fluid resistance member,
  η: the viscosity coefficient of the fluid,
  L: a flow path length of the fluid resistance member, and
  Δp: the differential pressure.

Also, the viscosity coefficient is dependent on fluid temperature, i.e., the temperature measurement value from the temperature sensor 8, and therefore the present embodiment is configured to obtain the accurate viscosity coefficient from the temperature measurement value to calculate the volumetric flow rate (or a mass flow rate obtained by multiplying this by a density).

Furthermore, the present embodiment may be adapted such that, for example, respective flow rates at a plurality of temperatures and a plurality of pressures are preliminarily obtained through experiments and stored in the memory, and a flow rate at actually measured temperature and pressure is calculated by interpolation, such as fitting, based on the experimental values.

The control circuit 6 is provided physically on the same board as that for the flow rate calculation circuit 9, and shares the CPU, memory, I/O channel, A/D converter, D/A converter, and other analog or digital electrical circuit with the flow rate calculation circuit 9. Also, the control circuit 6 is adapted to fulfill a function that, on the basis of cooperative operation of the CPU and other peripheral devices according to a program stored in the memory, controls the flow rate control valve 4 to adjust the fluid flow rate in the internal flow path 1$a$, which is calculated by the flow rate calculation circuit 9, to an externally indicated setting flow rate.

Specifically, when the setting flow rate is provided from an operator or another external device, the control circuit 6 calculates a deviation between the setting flow rate and the flow rate calculated by the flow rate calculation circuit 9, and on the basis of the deviation, outputs an instruction signal for expanding or contracting the stacked piezoelectric element 412 to the flow rate control valve 4 so as to bring the calculated flow rate close to the setting flow rate. By doing this, the separation distance between the valve seating surface 42$a$ and the valve element 41$a$ is varied to adjust the flow rate of the fluid flowing through the flow rate control valve 4, i.e., the flow rate of the fluid flowing through the internal flow path 1$a$.

Accordingly, in such a configuration, even if the temperatures of the pressure sensors 21 and 22 and fluid resistance member 3 are varied with time due to heat generated from an electromagnetic type open-close valve or the like at the time of applying current, and the temperatures are different among them, the temperatures of the pressure sensors 21 and 22 and the temperature of the target fluid flowing through the fluid resistance member 3 are separately measured, and the respective measured temperatures are used as calculation parameters in the calculation of the flow rate of the target fluid, so that the flow rate having extremely high accuracy can be calculated.

Also, the resistive elements 2B for measuring pressures are used concurrently as means adapted to measure the temperatures of the pressure sensors 21 and 22, and therefore compactness, i.e., narrowness of the width is not lost.

In particular, in the present embodiment, the pressure sensors 21 and 22 are configured such that the pressure sensitive surfaces 2$b$1 thereof are raised vertically to the attachment surfaces 2$a$ thereof. The pressure sensors 21 and 22 are also attached to the component attachment surface 1$c$ in series such that, in the plan view, the flow direction of the fluid and the pressure sensitive surfaces 2$b$1 are parallel to each other, and while the pressure sensitive surfaces 2$b$1 are increased in area to keep high sensitivity, they are formed into an elongated shape in the plan view by decreasing the width direction size. For this reason, as compared with a configuration in which the pressure sensitive surfaces are laid down, the pressure sensors 21 and 22 are distant from the internal flow path 1$a$ provided with the fluid resistance member 3, and therefore temperature differences between the fluid resistance member 3 and the pressure sensitive surfaces 2$b$1 tend to be increased. However, according to the present embodiment, as described above, the temperatures of the pressure sensors 21 and 22 and the temperature of the target fluid flowing through the fluid resistance member 3 are separately measured, and therefore such errors can be certainly reduced to measure the flow rate with high accuracy.

Further, the temperature sensor 8 is embedded in the main body member 2A of the upstream side pressure sensor 21 that seals the fluid resistance member 3, and is brought as close to the fluid resistance member 3 as possible, so that more reliable temperature of the target fluid can be sensed. Also, a position of the embedment is set to a so-called dead space of the main body member 2A, and therefore the compactness is not lost.

Other collateral effects also include, because the flow rate control valve 4 and the fluid resistance member 3 are provided on the component attachment surface 1$c$ in the body unit 1 side by side, an effect of being able to make a volume of the internal flow path 1$a$ that makes a connection between the flow rate control valve 4 and the fluid resistance member 3 as small as possible. Accordingly, a time lag between the sensing of the flow rate and the control of the flow rate can be reduced to significantly improve control responsiveness of the flow rate controller 100.

Further, regarding the flow rate control valve 4, the diaphragm member 411$b$ is concurrently provided with functions as a sealing member for sealing the housing 411$a$ of the piezoelectric element 412 in an airtight manner and as a valve element that adjusts the flow rate, and therefore the number of components can be reduced to perform downsizing and space saving. Also, the diaphragm member 411$b$ is molded integrally on the one end surface of the housing 411$a$, and also the other end surface is provided with the airtightness holding member 411$c$.3, so that the airtightness inside the housing can be certainly kept. Further, the present embodiment is configured to be able to push and pull the piezoelectric element 412 by the adjustment screw 411$c$.2 through the airtightness holding member 411$c$.3, and therefore the position of the piezoelectric element 412 can also be adjusted with the airtightness inside the housing being kept.

Note that the present invention is not limited to the above-described embodiment. For example, the pressure measurement value of the upstream side pressure sensor is largely involved in flow rate measurement accuracy as compared with the downstream side pressure sensor, and therefore the present invention may be adapted to provide the temperature measurement mode only to the upstream side pressure sensor to calculate the pressure value based on temperature correction.

The flow rate or pressure-flow rate characteristics may be determined not from the theoretical expressions but from experiments or the like, and if the fluid resistance member is a critical nozzle or the like, the flow rate may be calculated only from the pressure measurement value of the upstream side pressure sensor. Also, the flow rate may be calculated not only from the differential pressure, but from any of various expressions, values, and the like that can be fitted in an actual device, such as [(n-th power of upstream side pressure)−(n-th power of downstream side pressure)], [(m-th power of downstream side pressure) to the K-th power of (upstream side pressure−downstream side pressure)], and combinations thereof.

Figure 12:
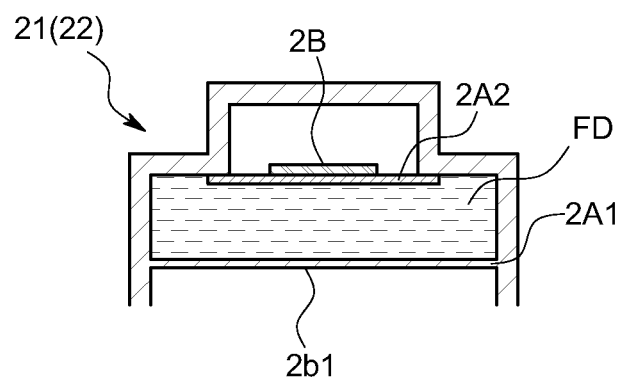
FIG. 12 is a partial cross-sectional view illustrating an internal structure of a pressure sensor in another embodiment of the present invention.
Figure 13:
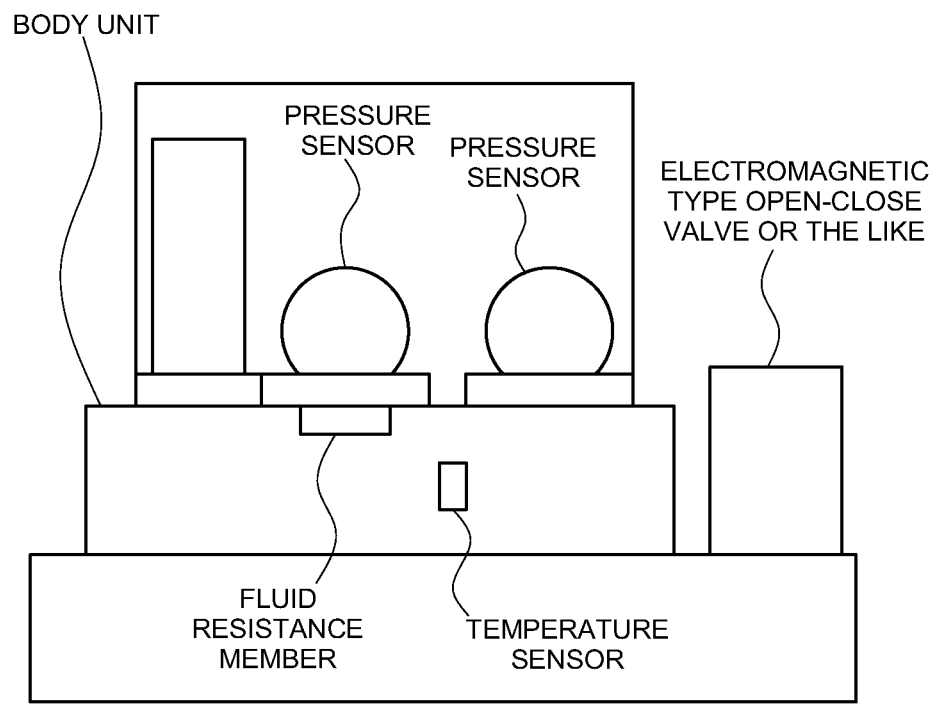
FIG. 13 is an overall perspective view illustrating a conventional flow rate controller.

The present invention may be configured such that, in the pressure sensor 21 (22), the resistive elements are not directly attached to the diaphragm wall 2A1 (pressure sensitive surface 2$b$1) that directly comes into contact with the target fluid, but as illustrated in FIG. 12, displacement of the diaphragm wall 2A1 is transmitted to a second diaphragm 2A2 through incompressible fluid FD, and the resistive elements 2B are attached to the second diaphragm 2A2. If so, the resistive elements 2B are unlikely to be influenced by a temperature change of the target fluid, and therefore a measurement can be made with higher accuracy. The resistive elements 2B may be attached to the incompressible fluid FD side.

A single body of the flow rate measuring device is also possible. Depending on circumstances, the present invention may be configured to omit the upstream side pressure sensor and include only the downstream side pressure sensor.

Further, a plurality of body units may be arranged with side surfaces (surfaces parallel to the longer direction) of the body units being in close contact with or close to each other to arrange a plurality of flow paths in parallel.

Accordingly, the present invention can be variously modified without departing from the scope thereof.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

Reference Character List
- 100: Flow rate controller
- 10: Flow rate measuring device
- 1: Body unit
- 1a: Internal flow path
- 21: Upstream side pressure sensor
- 22: Downstream side pressure sensor
- 2b1: Pressure sensitive surface
- 3: Fluid resistance member
- 6: Control circuit

The invention claimed is:

1. A flow rate measuring device comprising:
a fluid resistance member through which target fluid to be measured flows;
an upstream side pressure sensor in an upstream side flow path, the upstream side pressure sensor having a pressure sensitive surface onto which the target fluid on an upstream side in the fluid resistance member is introduced, the upstream side pressure sensor configured to measure a pressure of the target fluid from a change of an electrical resistance value of a resistive element that is provided so as to be deformed in conjunction with deformation of the pressure sensitive surface and to measure a temperature of the upstream side pressure sensor from a temperature-dependent change of the electrical resistance value of the resistive element;
a temperature sensor that is arranged in a location where a temperature of the target fluid flowing through the fluid resistance member is measured; and
a flow rate calculation part that calculates a flow rate of the target fluid on a basis of at least the pressure measured by the upstream side pressure sensor of the upstream side flow path, a pressure-flow rate characteristic of the fluid resistance member, the temperature of the upstream side pressure sensor measured by the upstream side pressure sensor, and a temperature of the target fluid in the fluid resistance member, the temperature of the target fluid being measured by the temperature sensor.

2. The flow rate measuring device according to claim 1, wherein
the temperature sensor is provided in proximity to the fluid resistance member.

3. The flow rate measuring device according to claim 1, further comprising
a body unit that is formed with an internal flow path through which the target fluid flows and has a longer direction, wherein:
the fluid resistance member is attached to the body unit so as to divide the internal flow path; and
the upstream side pressure sensor is attached to a component attachment surface that is set to a surface parallel to the longer direction of the body unit in an orientation that makes the pressure sensitive surface thereof substantially vertical to the component attachment surface and substantially parallel to the longer direction.

4. The flow rate measuring device according to claim 3, wherein:
the fluid resistance member is fitted into a concave portion that is opened on the component attachment surface of the body unit;
the upstream side pressure sensor comprises a main body member inside which the pressure sensitive surface is formed; and
an opening of the concave portion is sealed by the main body member, and immediately above an opening sealing surface in the main body member, the temperature sensor is incorporated.

5. A flow rate controller, comprising:
the flow rate measuring device according to claim 3;
a flow rate control valve that is attached to the body unit; and
a control circuit that controls a flow rate control valve so as to make a measured flow rate by the flow rate measuring device equal to a preset target flow rate.

6. The flow rate measuring device according to claim 1, wherein
the fluid resistance member flows the target fluid in a laminar flow state.

7. The flow rate measuring device according to claim 1, further comprising
a downstream side pressure sensor that has a pressure sensitive surface onto which the target fluid on a downstream side in the fluid resistance member is introduced, the downstream side pressure sensor configured to measure a pressure of the target fluid in a flow path on a downstream side of the fluid resistance member from a change of an electrical resistance value of a resistive element that is provided so as to be deformed in conjunction with deformation of the pressure sensitive surface and to measure a temperature of the downstream side pressure sensor from a temperature-dependent change of the electrical resistance value of the resistive element, wherein
the flow rate calculation part calculates the flow rate of the target fluid further on a basis of the pressure of the downstream side flow path measured by the downstream side pressure sensor, and the temperature of the downstream side pressure sensor.

* * * * *